United States Patent [19]

Okazaki et al.

[11] 4,431,789

[45] Feb. 14, 1984

[54] NOVEL ORGANOPOLYSILOXANE HAVING ALCOHOLIC HYDROXY GROUPS AND A METHOD FOR THE PREPARATION THEREOF

[75] Inventors: Satoshi Okazaki; Kenichi Isobe, both of Gunma, Japan

[73] Assignee: Shin-Etsu Chemical Co., Ltd., Tokyo, Japan

[21] Appl. No.: 353,508

[22] Filed: Mar. 1, 1982

[30] Foreign Application Priority Data

Mar. 13, 1981 [JP] Japan .................................. 56-36134

[51] Int. Cl.$^3$ ....................... C08G 77/06; C08G 77/40
[52] U.S. Cl. ..................................... 528/15; 525/479; 528/29; 556/445
[58] Field of Search .................... 525/479; 528/29, 15; 556/445

[56] References Cited

U.S. PATENT DOCUMENTS

| | | | |
|---|---|---|---|
| 3,381,019 | 4/1968 | Morehouse | 525/479 |
| 3,511,788 | 5/1970 | Keil | 525/479 |
| 3,530,159 | 9/1970 | Guinet et al. | 525/479 |
| 4,332,922 | 6/1982 | Kossmehl et al. | 525/479 |

FOREIGN PATENT DOCUMENTS 55-036258  3/1980  Japan .................................. 525/479

*Primary Examiner*—Wilbert J. Briggs, Sr.
*Attorney, Agent, or Firm*—Toren, McGeady and Stanger

[57] ABSTRACT

The invention provides an organopolysiloxane having at least one polyhydric pendant group bonded to the silicon atom as derived from a polyglycerol compound. Such an organopolysiloxane is useful as a non-ionic surface active agent. The organopolysiloxane can be prepared by the hydrosilation reaction between an organohydrogenpolysiloxane having at least one hydrogen atom directly bonded to the silicon atom and a polyglycerol compound having an aliphatically unsaturated linkage in the molecule such as those obtained by the reaction of allyl alcohol and glycidol or by the reaction of diglycerin and allyl glycidyl ether.

5 Claims, 4 Drawing Figures

NOVEL ORGANOPOLYSILOXANE HAVING ALCOHOLIC HYDROXY GROUPS AND A METHOD FOR THE PREPARATION THEREOF

BACKGROUND OF THE INVENTION

The present invention relates to a novel organopolysiloxane having alcoholic hydroxy groups and a method for the preparation thereof.

There are known, in the prior art of silicones, various kinds of organopolysiloxane compounds having an activity as a surface active agents. They are classified roughly according to the nature of the hydrophilic groups with which the silicone compound is modified into four classes of those compounds having anionic, cationic, amphoteric and nonionic hydrophilic groups.

Among the above named four classes of the surface active compounds, in particular, the nonionically hydrophilic groups include oxyethylene groups obtained by the ring opening of ethyleneoxide having an H.L.B. value of 0.33 and alcoholic hydroxy groups having an H.L.B. value of 1.9 and the surface active organopolysiloxane compounds of the most widely used nonionic type are the so-called polyether-modified ones having the oxyethylene groups as the hydrophilic groups.

On the other hand, there are known few nonionic surface active organopolysiloxane compounds in which the hydrophilic groups are the hydroxy groups derived from polyhydric alcohols. The only example of such surface active organopolysiloxane compounds is disclosed, for example, in Japanese Patent Publication 48-19941 according to which a methylhydrogenpolysiloxane and an aliphatic polyhydric alcohol or a polyoxyalkylene alcohol are subjected to a dehydrogenation reaction to introduce the alcoholic hydroxy groups into the organopolysiloxane to form a surface active silicone compound useful as an additive in toiletries.

The above described nonionic surface active organopolysiloxane compound is obtained by the dehydrogenation reaction between a methylhydrogenpolysiloxane and a polyhydric alcohol to introduce the hydrophilic groups into the polysiloxane but great difficulties are usually encountered in carrying out such a dehydrogenation reaction because the reaction mixture may readily be gelled in the course of the reaction so that the desired product can hardly be obtained in an industrially significant yield.

Another problem in carrying out the above mentioned dehydrogenation reaction is the difficulty in obtaining a suitable solvent capable of dissolving both of the reactants. For example, the use of toluene and other hydrocarbon solvents most widely used in the synthetic preparation of silicones is limited as a solvent for an alcohol having a relatively long hydrocarbon group such as lauryl clcohol and stearyl alcohol and the dehydrogenation reaction with a strongly hydrophilic polyglycerol and the like as one of the reactants can hardly be practiced due to the insolubility of the polyglycerol and the like in toluene or other conventional solvents.

Therefore, there has been developed almost no promising way for the preparation of nonionically surface active organopolysiloxane compounds in which the hydrophilic groups are the hydroxy groups derived from a polyhydric alcohol notwithstanding the eager desire to develop novel and useful applications of such a surface active agent.

SUMMARY OF THE INVENTION

It is therefore an object of the present invention to provide a novel and improved method for the preparation of a nonionically surface active organopolysiloxane compound having alcoholic hydroxy groups derived from a polyglycerol as the hydrophilic groups free from the above described problems or drawbacks in the prior art methods such as the gelation of the reaction mixture or the difficulty in obtaining a suitable solvent for carrying out the reaction. The objective nonionically surface active organopolysiloxane compound is a diorganopolysiloxane having a linear molecular structure represented by the general formula

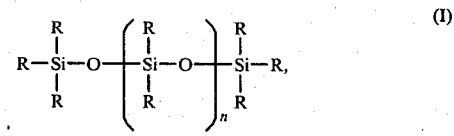
(I)

in which at least one of the groups denoted by the symbol R is a group having a plurality of alcoholic hydroxy groups expressed by the formula

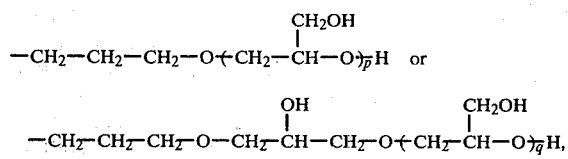

p and q in the above formulas being each a positive integer, and the balance of the groups denoted by R other than the above defined polyhydric group or groups are selected from the class consisting of a hydrogen atom, hydroxy group and monovalent hydrocarbon groups with n being a positive integer. Such a polyhydric organopolysiloxane is a novel compound not known in the prior art nor described in any literatures.

The method of the invention for the preparation of the above defined polyhydric organopolysiloxane compound comprises reacting an organohydrogenpolysiloxane with a polyglycerol compound having an aliphatically unsaturated linkage in a molecule in the presence of a catalyst of or containing a group VIII noble metal in the Periodic Table such as a platinum compound.

DETAILED DESCRIPTION OF THE PREFERRED EMBODIMENTS

Figure 1:
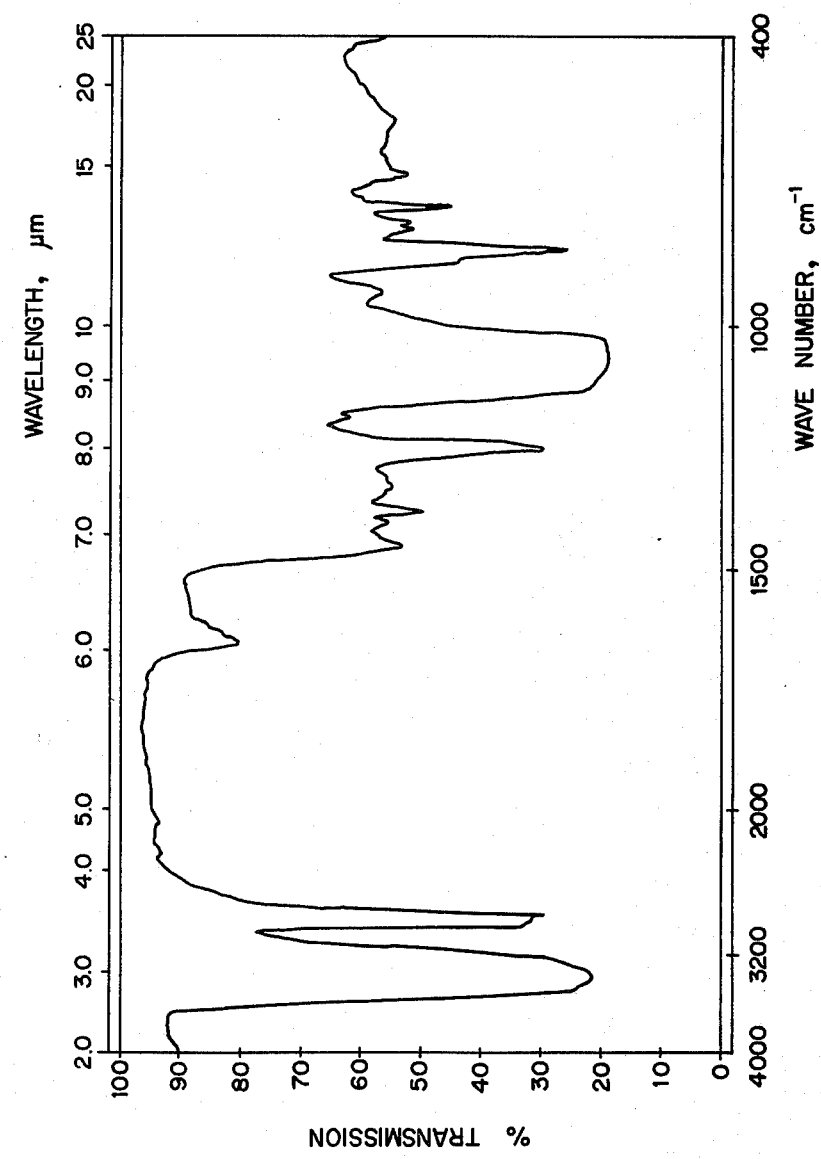
FIG. 1 and FIG. 2 are the infrared absorption spectrum and N.M.R. absorption spectrum, respectively, of the allyl polyglycerin ether prepared in Example 1.

As is understood from the above description, the surface activity of the organopolysiloxane compound prepared by the inventive method is exhibited by the balance of the lyophilicity of the organopolysiloxane structure and the hydrophilicity of the polyhydric pendant groups in the molecule derived from a polyglycerol compound.

Generally speaking, selection of a suitable solvent for the reaction mixture is the largest problem in carrying out a reaction for the modification of an organopolysiloxane with a polyhydric alcohol such as polyglycerols. This is because the strongly hydrophilic polyhydric alcohols such as polyglycerols are soluble in aocohols and water but insoluble in hydrocarbon solvents such as toluene and n-hexane whereas organopolysiloxanes are generally soluble in the latter class of the solvents and certain alcohols but insoluble in water so that the reaction of an organopolysiloxane and a polyhydric alcohol must be carried out either in an alcoholic solvent or without the use of any solvent. However, the dehydrogenation reaction cannot be performed in an alcoholic solvent because the reaction between them is strongly disturbed by the presence of an alcohol.

Accordingly, in view of the difficulty in carrying out the dehydrogenation reaction between an organopolysiloxane and a polyhydric alcohol, the inventors' efforts have been directed to discover a reaction of a different type from the above dehydrogenation in which the polyhydric groups derived from the polyhydric alcohol can be introduced into the siloxane as the hydrophilic pendant groups. The extensive investigations undertaken by the inventors have led to a conclusion that the most advantageous type of the reaction in the above object is the so-called hydrosilation which is the addition reaction between an organosilicon compound having a hydrogen atom directly bonded to the silicon atom and an organic compound having aliphatic unsaturation in the molecule. The reaction in this case should be performed with an organohydrogenpolysiloxane and a polyglycerol compound having aliphatic unsaturation in the molecule since this reaction can proceed even in the presence of an alcoholic solvent which can dissolve both of the reactants.

The above mentioned organohydrogenpolysiloxane as one of the starting reactants in the method of the present invention is a polysiloxane compound having at least one hydrogen atom directly bonded to the silicon atom in a molecule without particular limitations in the viscosity, degree of polymerization and molecular configuration. Such an organohydrogenpolysiloxane may be a conventional one represented, for example, by the following formulas:

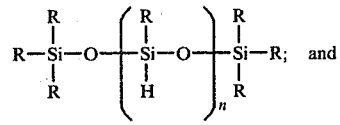

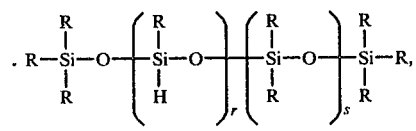

in which R is a monovalent hydrocarbon group or a hydroxy group and n, r and s are each a positive integer. One or more of the groups denoted by R and bonded to the terminal silicon atoms also may be hydrogen atoms to form Si-H linkages.

The polyglycerol compound as the other one of the starting reactants to be reacted with the above mentioned organohydrogenpolysiloxane in the reaction of the inventive method should have at least one aliphatically unsaturated linkage, e.g. ethylenic unsaturation, in a molecule. Particular examples of such polyglycerol compounds are those expressed by the following formulas:

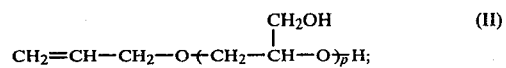

and

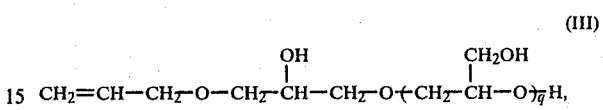

in which p and q are each a positive integer.

The compound expressed by the above given formula (II) can be prepared by the reaction of allyl clcohol with glycidol and the compound expressed by the formula (III) can be prepared by the reaction of diglycerin and allyl glycidyl ether.

The above described reaction of the hydrosilation is accelerated by a catalyst which is a compound or elementary form of a group VIII noble metal in the Periodic Table such as platinum and rhodium. Several examples of suitable catalysts are chloroplatinic acid, chloroplatinic acid modified with an alcohol as disclosed in U.S. Pat. No. 3,220,972, complexes of chloroplatinic acid with an olefin as disclosed in U.S. Pat. Nos. 3,159,601, 3,159,662 and 3,775,452, platinum black, elementary platinum supported on a catalyst carrier such as alumina, silica and the like and comlexes of rhodium and an olefin.

The essential step in the inventive method is the reaction of the hydrosilation between the above described organohydrogenpolysiloxane and the polyglycerol compound in the presence of the noble metal catalyst, in which the molar ratio of the two reactants should be such that the molar content of the hydrogen atoms directly bonded to the silicon atoms in the organohydrogenpolysiloxane to the aliphatically unsaturated linkages in the polyglycerol compound is in the range from 0.1 to 1.5 or, preferably, from 0.6 to 1.0.

In practicing the method of the present invention, the use of a solvent for diluting the reaction mixture is not essential but, if necessary, various kinds of organic solvents can be used provided that the addition reaction between the reactants is not unduly disturbed. In particular, alcoholic solvents, e.g. isopropyl alcohol, are suitable.

The proceeding of the addition reaction between the reactants can readily be followed by the determination of the decreased amount of the silicon-bonded hydrogen atoms which can be decomposed and evolved as hydrogen gas or by the infrared absorption spectroscopy. When the reaction has proceeded to a desired extent, the objective organopolysiloxane modified with the polyglycerol is obtained, if necessary, by removing the solvent by distillation.

In carrying out the above described addition reaction or hydrosilation, there may take place the dehydrogenation reaction between the silicon-bonded hydrogen atoms and the alcoholic hydroxy groups in the polyglycerol compound depending on the reaction conditions but such an undesirable side reaction can readily be prevented or reduced by the use of an acidity-controlling agent such as a solution of potassium acetate in ethyl alcohol.

Following are the examples of the structural formulas of the compounds obtained by the inventive method corresponding to the general formula (I) for the organopolysiloxanes modified with a polyglycerol:

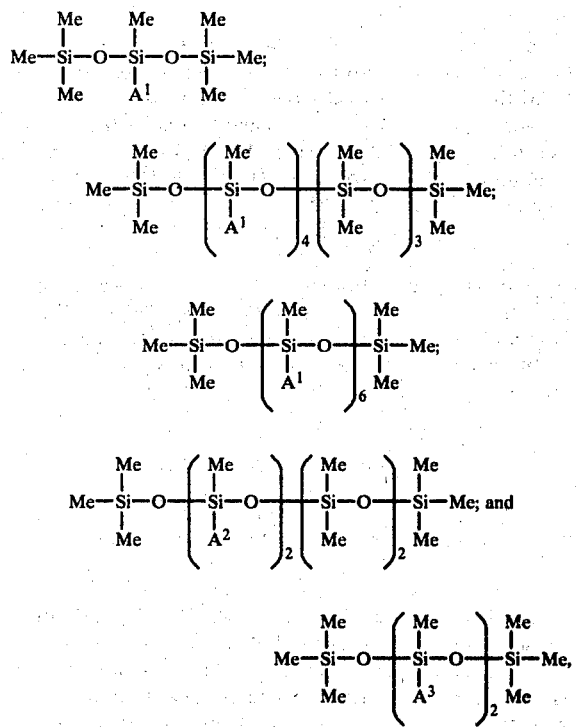

in which Me is a methyl group; $A^1$ is a polyhydric group expressed by the formula

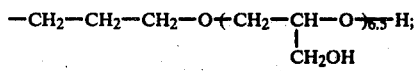

$A^2$ is a polyhydric group expressed by the formula

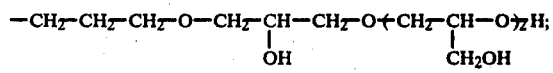

and $A^3$ is a polyhydric group expressed by the formula

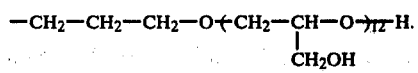

In the following, examples are given to illustrate the method of the present invention but not to limit the scope of the invention in any way.

EXAMPLE 1

Into a four-necked flask of 1 liter capacity equipped with a stirrer, a condenser, a thermometer and a dropping funnel were introduced 116 g (2 moles) of allyl alcohol together with 0.3 g of potassium hydroxide as the catalyst and the mixture was heated up to 70° C. While keeping the temperature of the mixture at 65° to 75° C., 740 g (110 moles) of glycidol were added thereinto dropwise through the dropping funnel over a period of 3 hours.

After completion of the addition of glycidol, the reaction mixture was further agitated for additional two hours at the same temperature to complete the reaction. Gas chromatographic analysis of this reaction product indicated that a small amount of the allyl alcohol was left unreacted.

Volatile matters were removed from the reaction mixture by stripping for 2 hours under reduced pressure reaching a temperature of 110° C. under a pressure of 5 mmHg. After cooling, 30 g of an adsorbent for potassium hydroxide (KYOWAAD-600, a product by Kyowa Chemical Co. expressed by a formula 2MgO.6-$SiO_2.xH_2O$) were added to the reaction mixture with agitation for 1 hour and then the mixture was heated to 100° C. and filtered as hot to give 708 g of a reaction product as the filtrate.

Figure 2:
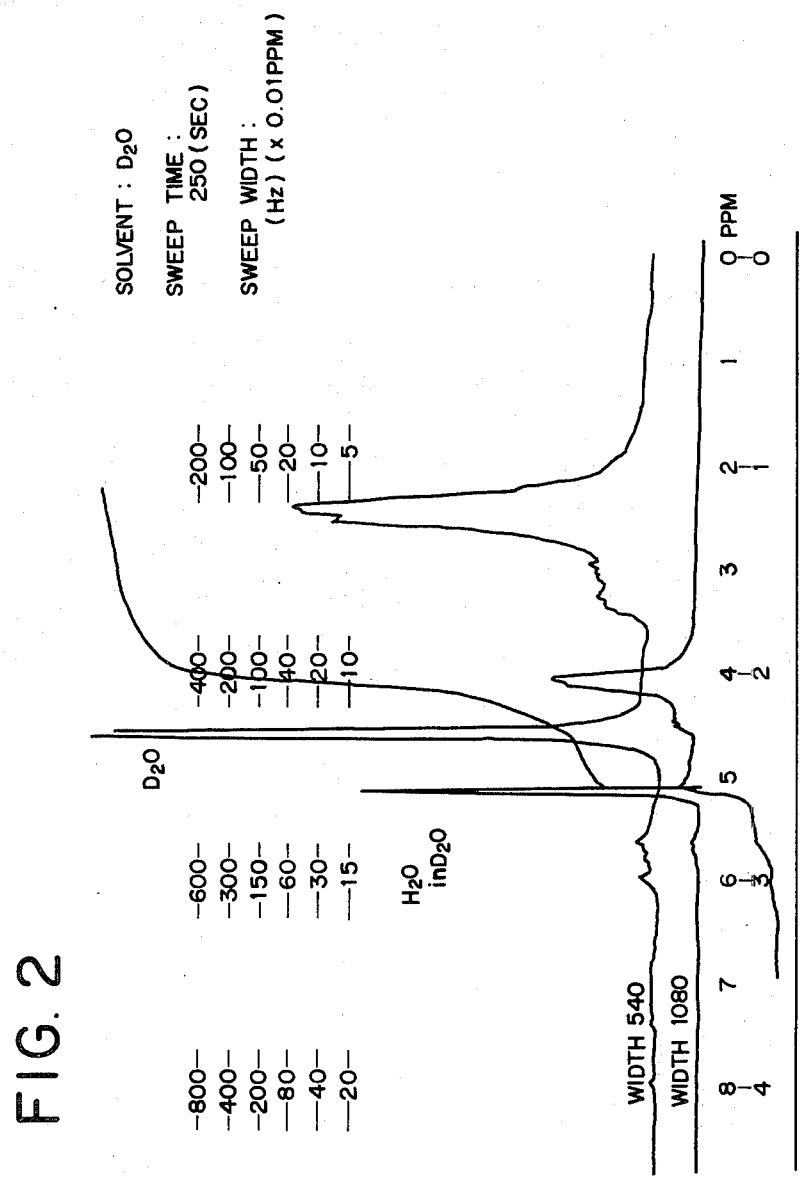

This product was identified to be an allyl glycerin ether expressed by the formula below from the results of the infrared absorption spectroscopy and the N.M.R. spectroscopy (see FIGS. 1 and 2) as was expected from the process of the synthesis.

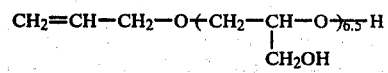

Following are some of the properties of this product.

| | |
|---|---|
| Hydroxyl value | 180 |
| Kinetic viscosity (at 100° C.) | 244 centistokes |
| Moisture content | 1% |
| pH (in a 10:6 mixture of isopropyl alcohol and water) | 7.4 |
| Degree of unsaturation | 1.34 meq/g |

EXAMPLE 2

Into the same four-necked flask as used in Example 1 were introduced 166 g (1 mole) of diglycerin together with 0.5 g of potassium hydroxide and the mixture was heated to a temperature of 80° C. While keeping the temperature of the mixture at 75° to 85° C., 103 g (0.9 mole) of allyl glycidyl ether were added dropwise thereinto through the dropping funnel over a period of 4 hours.

After completion of the addition of allyl glycidyl ether, the reaction mixture was further agitated for additional 3 hours to complete the reaction at the same temperature followed by the addition of 30 g of KYO-WAAD-600 and agitation for further 1 hour and the mixture was filtrated at 60° C. Volatile matters in the filtrate were removed by stripping for 1 hour at 100° C. under a pressure of 5 mmHg. Gas chromatographic analysis of the filtrate after the above stripping indicated that the composition of this product was as follows.

| | |
|---|---|
| Unreacted diglycerin | 18.3% |
| Addition product of 1 mole of allyl glycidyl ether | 49.2% |
| Addition product of 2 moles of allyl glycidyl ether | 23.8% |
| Others | 8.7% |

It was concluded from the above results that the main ingredient in the reaction product after stripping was a compound expressed by the following structural formula.

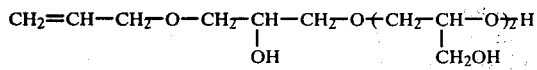

Several of the properties of this product were as follows.

| Hydroxyl value | 78.9 |
|---|---|
| Kinetic viscosity (at 100° C.) | 27.2 centistokes |
| (at 25° C.) | 2840 centistokes |
| Degree of unsaturation | 3.66 meq/g |
| pH (in a 5% aqueous solution) | 5.9 |
| Moisture content | 0.05% |

EXAMPLE 3

An allyl polyglycerin ether expressed by the structural formula

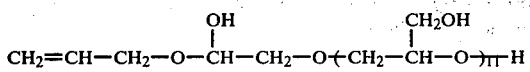

was prepared in the same manner as in Example 2 excepting that the diglycerin was replaced with an equimolar amount of undecaglycerin of the formula

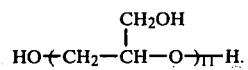

Several of the properties of this compound were as follows.

| Hydroxyl value | 770 |
|---|---|
| Kinetic viscosity (at 100° C.) | 413 centistokes |
| Moisture content | less than 0.7% |
| pH (in a 5% aqueous solution) | 7.6 |
| Degree of unsaturation | 0.92 meq/g |

EXAMPLE 4

Into a flask of 1 liter capacity equipped with a stirrer, a condenser and a thermometer were introduced 100 g of an allyl polyglycerin prepared in Example 1, 24 g of 1,1,1,3,5,5,5-heptamethyltrisiloxane having a purity of at least 98%, 200 g of isopropyl alcohol, 0.5 g of a 10% solution of potassium acetate in ethyl alcohol and 0.5 g of an isopropyl alcohol solution of chloroplatinic acid in a concentration of 0.2% as platinum and the mixture was heated for 3 hours under reflux of isopropyl alcohol to effect the reaction.

After completion of the reaction, a small portion of the reaction mixture was taken and analyzed for the determination of the unreacted silicon-bonded hydrogen atoms to give a result that the residual amount was 1.4% of the silicon-bonded hydrogen atoms in the trisiloxane compound initially taken corresponding to 98.6% of conversion by the addition reaction.

Figure 3:
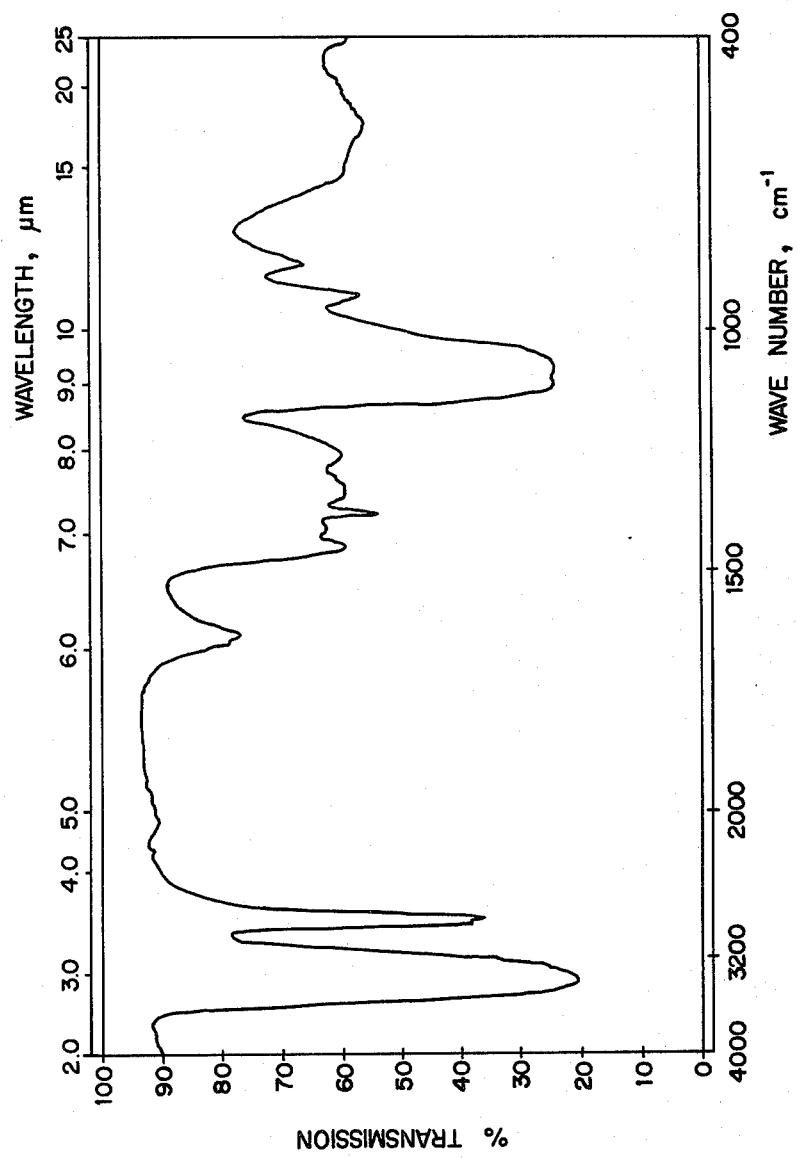
FIG. 3 and FIG. 4 are the infrared absorption spectrum and N.M.R. absorption spectrum, respectively, of the organopolysiloxane modified with polyglycerol as prepared in Example 4.
Figure 4:
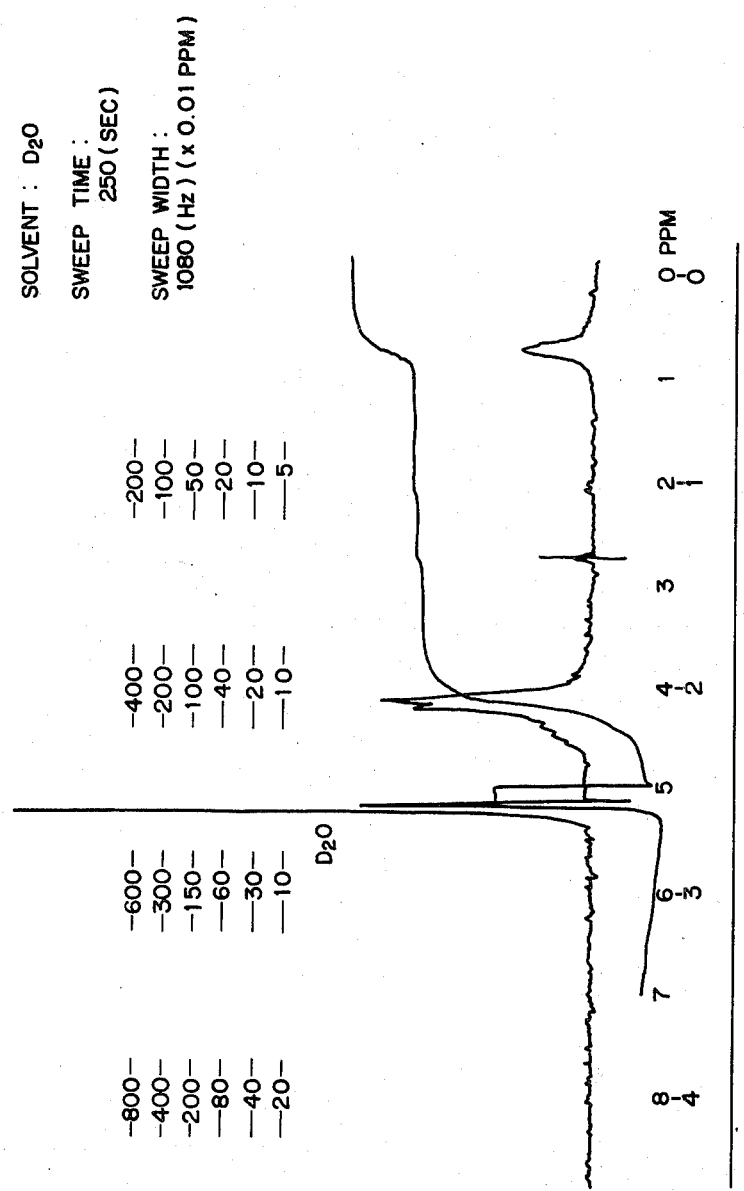

FIG. 3 and FIG. 4 are the infrared absorption spectrum and the N.M.R. absorption spectrum, respectively, of the reaction mixture after stripping of the volatile matter at 90° to 110° C. under a pressure of 5 mmHg.

Although the molar ratio of the silicon-bonded hydrogen atoms to the allyl groups in the starting reaction mixture was 0.8 and a small amount of the allyl groups was left unreacted, the N.M.R. spectrum had no absorption corresponding thereto with appearance of a specific absorption due to the group of Si—CH$_2$— instead.

The solubility of this product in water was not complete at room temperature and no clear aqueous solution of 1% concentration thereof could be prepared which turned clear when heated at 80° C. with disappearance of turbidity.

The surface tension of the thus prepared aqueous solution of 1% concentration was 21.4 dyne/cm at 25° C. and the Ross-Miles values at 40° C. as a measure of the foaming power were 3.5 cm and 0.8 cm at the start and after 5 minutes, respectively. The viscosity of the compound was 302 centipoise at 100° C. and the refractive index was 1.4782 at 25° C.

EXAMPLE 5

Reaction was performed in the same manner as in Example 4 with a reaction mixture composed of 100 g of the allyl polyglycerin ether prepared in Example 1, 14 g of a methylhydrogenpolysiloxane expressed by the formula

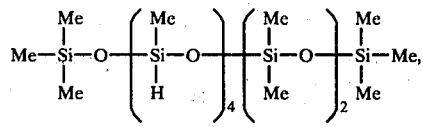

200 g of isopropyl alcohol, 0.5 g of a 10% solution of potassium acetate in ethyl alcohol and 0.5 g of the same solution of chloroplatinic acid as used in Example 4.

The reaction product obtained here was soluble in water even at room temperature to give a clear aqueous solution of 1% concentration exhibiting strong surface activity with a surface tension of 21.7 dyne/cm at 25° C. and Ross-Miles values at 40° C. of 12.6 cm and 8.5 cm at the start and after 5 minutes, respectively.

EXAMPLE 6

Reaction was performed in the same manner as in Example 4 with a reaction mixture composed of 100 g of the allyl polyglycerin ether prepared in Example 1, 10 g of a methylhydrogenpolysiloxane expressed by the formula

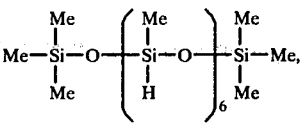

200 g of isopropyl alcohol, 0.5 g of a 10% solution of potassium acetate in ethyl alcohol and 0.5 g of the same solution of chloroplatinic acid as used in Example 4.

The reaction product obtained here was readily soluble in water even at room temperature to give a clear aqueous solution of 1% concentration exhibiting strong surface activity with a surface tension of 22.5 dyne/cm at 25° C. and Ross-Miles values at 40° C. of 18.5 cm and 15.3 cm at the start and after 5 minutes, respectively.

EXAMPLE 7

Reaction was performed in the same manner as in Example 4 with a reaction mixture composed of 100 g of the reaction product obtained in Example 2, 70 g of a methylhydrogenpolysiloxane expressed by the formula

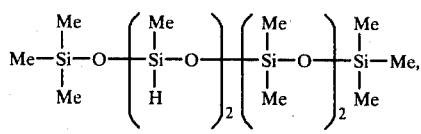

200 g of isopropyl alcohol, 0.5 g of a 10% solution of potassium acetate in ethyl alcohol and 0.5 g of an isopropyl alcohol solution of chloroplatinic acid in a concentration of 0.2% as platinum. The conversion of the methylhydrogenpolysiloxane was 98.1%.

The solubility of this product in water was not complete at room temperature to give an aqueous solution of 1% concentration with turbidity exhibiting strong surface activity with a surface tension of 20.3 dyne/cm at 25° C. though with almost no foaming power.

EXAMPLE 8

Reaction was performed in the same manner as in Example 4 with a reaction mixture composed of 100 g of the allyl polyglycerin ether prepared in Example 3, 10.3 g of 1,1,1,3,5,7,7,7-octamethyltetrasiloxane, 200 g of isopropyl alcohol, 0.5 g of a 10% solution of potassium acetate in ethyl alcohol and 0.5 g of the same solution of chloroplatinic acid as used in Example 7.

The reaction product here obtained was readily soluble in water even at room temperature to give a clear aqueous solution of 1% concentration exhibiting strong surface activity and excellent foaming power with a surface tension of 24.8 dyne/cm at 25° C. and Ross-Miles values at 40° C. of 21.3 cm and 16.5 cm at the start and after 5 minutes, respectively.

Following is a summary of the values of the surface tension determined at 25° C. with 1% aqueous solutions of various compounds including the organopolysiloxanes modified with glycerin according to the method of the present invention.

| No. | Compound | Surface tension, dyne/cm |
|---|---|---|
| 1 | Water, distilled | 72.4 |
| 2 | $CH_2=CH-CH_2-O+CH_2-CH(CH_2OH)-O+_{6.5}H$ | 43.5 |
| 3 | $CH_2=CH-CH_2-O-CH_2-CH(OH)-CH_2-O+CH_2-CH(CH_2OH)-O+_{7.2}H$ | 53.7 |
| 4 | $CH_2=CH-CH_2-O-CH_2-CH(OH)-CH_2-O+CH_2-CH(CH_2OH)-O+_{11.2}H$ | 41.2 |
| 5 | $CH_2=CH-CH_2-O-CH_2-CH(CH_2OH)-OH$ | 67.1 |
| 6 | Me-Si(Me)(Me)-O-Si(Me)(H)-O-Si(Me)(Me)-Me | 57.9 |
| 7 | Me-Si(Me)(Me)-O-[Si(Me)(H)-O]$_2$-[Si(Me)(Me)-O]-Si(Me)(Me)-Me | 59.9 |
| 8 | Me-Si(Me)(Me)-O-[Si(Me)(H)-O]$_4$-[Si(Me)(Me)-O]$_6$-Si(Me)(Me)-Me | 60.6 |
| 9* | Reaction product of polyglycerol (compound No. 2) and methylhydrogenpolysiloxane (compound No. 6) | 21.6 |
| 10 | Reaction product of polyglycerol (compound No. 2) and a methylhydrogenpolysiloxane Me-Si(Me)(Me)-O-[Si(Me)(H)-O]$_4$-[Si(Me)(Me)-O]$_2$-Si(Me)(Me)-Me | 21.7 |
| 11 | Reaction product of polyglycerol (compound No. 2) and a methylhydrogenpolysiloxane | 22.5 |

-continued

| No. | Compound | Surface tension, dyne/cm |
|---|---|---|
| | $$\text{Me}-\underset{\underset{\text{Me}}{|}}{\overset{\overset{\text{Me}}{|}}{\text{Si}}}-\text{O}-\left(\underset{\underset{\text{H}}{|}}{\overset{\overset{\text{Me}}{|}}{\text{Si}}}-\text{O}\right)_{6}\underset{\underset{\text{Me}}{|}}{\overset{\overset{\text{Me}}{|}}{\text{Si}}}-\text{Me}$$ | |
| 12* | Reaction product of polyglycerol (compound No. 3) and methylhydrogenpolysiloxane (compound No. 7) | 20.3 |
| 13 | Reaction product of polyglycerol (compound No. 4) and a methylhydrogenpolysiloxane | 24.8 |
| | $$\text{Me}-\underset{\underset{\text{Me}}{|}}{\overset{\overset{\text{Me}}{|}}{\text{Si}}}-\text{O}-\left(\underset{\underset{\text{H}}{|}}{\overset{\overset{\text{Me}}{|}}{\text{Si}}}-\text{O}\right)_{2}\underset{\underset{\text{Me}}{|}}{\overset{\overset{\text{Me}}{|}}{\text{Si}}}-\text{Me}$$ | |
| 14 | Reaction product of polyglycerol (compound No. 2) and methylhydrogenpolysiloxane (compound No. 8) | 25.8 |
| 15* | Reaction product of polyglycerol (compound No. 2) and methylhydrogenpolysiloxane (compound No. 6) | 21.6 |
| 16* | Reaction product of polyglycerol (compound No. 5) and methylhydrogenpolysiloxane (compound No. 8) | 22.3 |
| 17 | Reaction product of polyglycerol (compound No. 2) and a methylhydrogenpolysiloxane | 23.2 |
| | $$\text{H}-\underset{\underset{\text{Me}}{|}}{\overset{\overset{\text{Me}}{|}}{\text{Si}}}-\text{O}-\left(\underset{\underset{\text{Me}}{|}}{\overset{\overset{\text{Me}}{|}}{\text{Si}}}-\text{O}\right)_{3}\underset{\underset{\text{Me}}{|}}{\overset{\overset{\text{Me}}{|}}{\text{Si}}}-\text{H}$$ | |

*The 1% aqueous solution was somewhat cloudy at 25° C.

What is claimed is:

1. A method for the preparation of an organopolysiloxane having at least one polyhydric group expressed by the formula $$-CH_2-CH_2-CH_2-O(CH_2-\underset{\underset{}{|}}{\overset{\overset{CH_2OH}{|}}{CH}}-O)_{\overline{p}}H$$

or $$-CH_2-CH_2-CH_2-O-CH_2-\underset{\underset{}{|}}{\overset{\overset{OH}{|}}{CH}}-CH_2-O(CH_2-\underset{\underset{}{|}}{\overset{\overset{CH_2OH}{|}}{CH}}-O)_{\overline{q}}H$$

in which p and q are each a positive integer, and bonded to the silicon atom which comprises heating a reaction mixture containing an organohydrogenpolysiloxane represented by the general formula

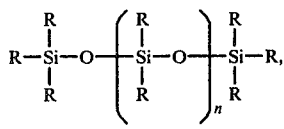

in which n is a positive integer and R is a hydrogen atom, a hydroxy group or a monovalent hydrocarbon group directly bonded to the silicon atom, at least one of the groups denoted by R being a hydrogen atom, and a polyglycerol compound having an aliphatically unsaturated linkage in a molecule expressed by the formula $$CH_2=CH-CH_2-O(CH_2-\underset{\underset{}{|}}{\overset{\overset{CH_2OH}{|}}{CH}}-O)_{\overline{p}}H$$

or $$CH_2=CH-CH_2-O-CH_2-\underset{\underset{}{|}}{\overset{\overset{OH}{|}}{CH}}-CH_2-O(CH_2-\underset{\underset{}{|}}{\overset{\overset{CH_2OH}{|}}{CH}}-O)_{\overline{q}}H,$$

in which p and q are each a positive integer, in the presence of a catalytic amount of a Group VIII noble metal in the Periodic Table and wherein the reaction mixture is diluted with isopropyl alcohol.

2. The method as claimed in claim 1 wherein the amount of the organohydrogenpolysiloxane in the reaction mixture is sufficient to give from 0.1 to 1.5 moles of the hydrogen atoms directly bonded to the silicon atoms per each mole of the aliphatically unsaturated linkages in the polyglycerol compound.

3. The method as claimed in claim 1 wherein the reaction mixture further contains potassium acetate.

4. An organopolysiloxane having at least one polyhydric pendant group bonded to the silicon atom represented by the general formula

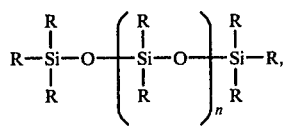

in which n is a positive integer and R is hydrogen atom, a hydroxy group or a monovalent hydrocarbon group and at least one of the groups denoted by R in a molecule is a polyhydric group expressed by the formula

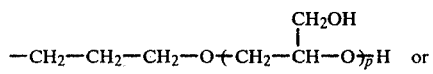

or

-continued

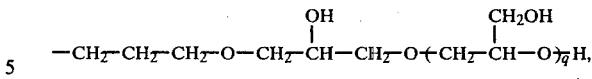

p and q in the formulas each being a positive integer.

5. The organopolysiloxane as claimed in claim 4 wherein the groups denoted by R other than the polyhydric group or groups are each a methyl group.

* * * * *